(12) United States Patent
Wexler et al.

(10) Patent No.: US 8,892,737 B2
(45) Date of Patent: *Nov. 18, 2014

(54) NETWORK SNIFFER FOR PERFORMING SERVICE LEVEL MANAGEMENT

(75) Inventors: Asaf Wexler, Raanana (IL); Yoav Dembak, Petah Tikwa (IL)

(73) Assignee: VMware, Inc., Palo Alto, CA (US)

( * ) Notice: Subject to any disclaimer, the term of this patent is extended or adjusted under 35 U.S.C. 154(b) by 831 days.

This patent is subject to a terminal disclaimer.

(21) Appl. No.: 11/682,433

(22) Filed: Mar. 6, 2007

(65) Prior Publication Data

US 2007/0208852 A1 Sep. 6, 2007

Related U.S. Application Data

(60) Provisional application No. 60/779,706, filed on Mar. 6, 2006.

(51) Int. Cl.
*G06F 15/173* (2006.01)
*G06F 9/50* (2006.01)
*H04L 29/08* (2006.01)

(52) U.S. Cl.
CPC ............ *G06F 9/505* (2013.01); *G06F 2201/87* (2013.01); *H04L 67/1008* (2013.01)
USPC ............................ 709/226; 709/223; 709/224

(58) Field of Classification Search
CPC .. G06F 9/505; G06F 2201/87; H04L 67/1008
USPC .................................. 709/223, 224, 226, 219
See application file for complete search history.

(56) References Cited

U.S. PATENT DOCUMENTS

| 6,108,700 | A  | * | 8/2000  | Maccabee et al. | 709/224 |
|-----------|----|---|---------|-----------------|---------|
| 6,151,624 | A  |   | 11/2000 | Teare et al.    |         |
| 6,453,345 | B2 | * | 9/2002  | Trcka et al.    | 709/224 |
| 6,701,459 | B2 |   | 3/2004  | Ramanathan et al. |       |
| 6,792,460 | B2 | * | 9/2004  | Oulu et al.     | 709/224 |
| 6,801,940 | B1 | * | 10/2004 | Moran et al.    | 709/224 |
| 6,813,635 | B1 |   | 11/2004 | Jorgenson       |         |
| 6,813,637 | B2 |   | 11/2004 | Cable           |         |
| 6,944,678 | B2 |   | 9/2005  | Lu et al.       |         |
| 6,970,933 | B1 |   | 11/2005 | Masters         |         |
| 7,032,017 | B2 |   | 4/2006  | Chow et al.     |         |
| 7,089,294 | B1 | * | 8/2006  | Baskey et al.   | 709/219 |
| 7,206,848 | B1 | * | 4/2007  | Zara et al.     | 709/229 |
| 7,272,646 | B2 | * | 9/2007  | Cooper et al.   | 709/223 |
| 7,392,160 | B2 |   | 6/2008  | Wicks et al.    |         |
| 7,401,159 | B1 | * | 7/2008  | Aviani et al.   | 709/238 |
| 7,506,047 | B2 |   | 3/2009  | Wiles           |         |

(Continued)

OTHER PUBLICATIONS

Berners-Lee, T., Hypertext Transfer Protocol—HTTP/1.0, RFC 1945, [online], May 1996, whole document, [retrieved on Dec. 12, 2011]. Retrieved from the Internet:<URL:http://tools.ietf.org/pdf/rfc1945.pdf>.*

*Primary Examiner* — Rupal Dharia
*Assistant Examiner* — Wing Ma

(57) ABSTRACT

A network sniffer where the sniffer learns the structure of a web application, monitors the operation of the application, and optionally controls the processing of incoming requests to achieve optimal performance as defined in a service level agreement (SLA). The network sniffer is operative for example in enterprise web applications and in enterprise data centers that deploy web applications and optimally is adapted to maintain a consistent level of service of web applications.

62 Claims, 8 Drawing Sheets

(56) References Cited

U.S. PATENT DOCUMENTS

| | | | |
|---|---|---|---|
| 7,508,764 B2* | 3/2009 | Back et al. ............... | 370/235 |
| 7,519,702 B1* | 4/2009 | Allan ........................ | 709/224 |
| 7,533,179 B2* | 5/2009 | Tarquini et al. ........... | 709/228 |
| 7,539,746 B2* | 5/2009 | Bankier et al. ............ | 709/224 |
| 7,543,051 B2 | 6/2009 | Greifeneder et al. | |
| 7,567,504 B2* | 7/2009 | Darling et al. ............ | 370/216 |
| 7,624,047 B1* | 11/2009 | Round ...................... | 705/26.1 |
| 7,693,996 B2 | 4/2010 | Wexler et al. | |
| 7,774,456 B1* | 8/2010 | Lownsbrough et al. ... | 709/224 |
| 7,804,787 B2* | 9/2010 | Brandyburg et al. ...... | 370/252 |
| 7,805,509 B2* | 9/2010 | Alon et al. ................ | 709/224 |
| 7,809,819 B2* | 10/2010 | DeLima et al. ............ | 709/223 |
| 7,937,470 B2 | 5/2011 | Curley et al. | |
| 8,566,919 B2* | 10/2013 | Meisel ...................... | 726/13 |
| 2002/0013849 A1* | 1/2002 | Schweitzer et al. ....... | 709/227 |
| 2002/0065911 A1 | 5/2002 | von Klopp et al. | |
| 2002/0073211 A1* | 6/2002 | Lin et al. .................. | 709/229 |
| 2002/0083371 A1* | 6/2002 | Ramanathan et al. ..... | 714/37 |
| 2002/0103663 A1* | 8/2002 | Bankier et al. ............ | 705/1 |
| 2002/0103896 A1 | 8/2002 | von Klopp Lemon | |
| 2002/0120727 A1* | 8/2002 | Curley et al. ............. | 709/223 |
| 2002/0194342 A1* | 12/2002 | Lu et al. ................... | 709/227 |
| 2003/0014464 A1* | 1/2003 | Deverill et al. ............ | 709/101 |
| 2003/0055883 A1* | 3/2003 | Wiles, Jr. .................. | 709/203 |
| 2003/0061360 A1 | 3/2003 | Chow et al. | |
| 2003/0078987 A1 | 4/2003 | Serebrennikov | |
| 2003/0097443 A1* | 5/2003 | Gillett et al. .............. | 709/225 |
| 2003/0145079 A1* | 7/2003 | Breese et al. ............. | 709/224 |
| 2003/0187946 A1 | 10/2003 | Cable | |
| 2003/0195961 A1* | 10/2003 | Breese et al. ............. | 709/226 |
| 2003/0200293 A1* | 10/2003 | Fearn et al. ............... | 709/223 |
| 2003/0221000 A1 | 11/2003 | Cherkasova et al. | |
| 2004/0015610 A1 | 1/2004 | Treadwell | |
| 2004/0103315 A1* | 5/2004 | Cooper et al. ............. | 713/201 |
| 2004/0107125 A1 | 6/2004 | Guheen et al. | |
| 2004/0109410 A1* | 6/2004 | Chase et al. ............... | 370/229 |
| 2004/0122942 A1* | 6/2004 | Green et al. ............... | 709/224 |
| 2004/0138939 A1 | 7/2004 | Theiler | |
| 2004/0243349 A1* | 12/2004 | Greifeneder et al. ...... | 702/183 |
| 2005/0039172 A1* | 2/2005 | Rees et al. ................ | 717/130 |
| 2005/0050212 A1* | 3/2005 | Mills et al. ................ | 709/229 |
| 2005/0066011 A1 | 3/2005 | Wicks | |
| 2005/0091322 A1* | 4/2005 | Hogstrom et al. ......... | 709/206 |
| 2005/0132030 A1* | 6/2005 | Hopen et al. .............. | 709/223 |
| 2005/0262098 A1 | 11/2005 | Manfredi et al. | |
| 2006/0064486 A1* | 3/2006 | Baron et al. ............... | 709/224 |
| 2006/0095570 A1* | 5/2006 | O'Sullivan ................. | 709/224 |
| 2006/0230437 A1* | 10/2006 | Alexander Boyer et al. ..... | 726/4 |
| 2007/0058632 A1* | 3/2007 | Back et al. ................ | 370/392 |
| 2007/0121626 A1* | 5/2007 | Shepard .................... | 370/389 |
| 2007/0143827 A1* | 6/2007 | Nicodemus et al. ....... | 726/2 |
| 2007/0150568 A1* | 6/2007 | Ruiz .......................... | 709/223 |
| 2008/0098453 A1* | 4/2008 | Hinton et al. .............. | 726/1 |
| 2008/0163064 A1* | 7/2008 | Swildens et al. .......... | 715/736 |
| 2008/0195369 A1* | 8/2008 | Duyanovich et al. ...... | 703/22 |
| 2009/0077419 A1* | 3/2009 | Di Palma et al. .......... | 714/21 |
| 2009/0313273 A1 | 12/2009 | Wexler et al. | |
| 2010/0094916 A1 | 4/2010 | Wexler et al. | |

* cited by examiner

NETWORK SNIFFER FOR PERFORMING SERVICE LEVEL MANAGEMENT

CROSS REFERENCE TO RELATED APPLICATIONS

This application claims priority from a U.S. provisional application 60/779,706 filed on Mar. 6, 2006 which is hereby incorporated for all that it contains.

TECHNICAL FIELD

The present invention relates generally to controlling and managing the performance of web applications.

BACKGROUND OF THE INVENTION

Enterprises and organizations expose their business information and functionality on the web through software applications, usually referred to as "web applications." Web applications provide great opportunities for an organization. Web applications use the Internet technologies and infrastructures. These applications are generally event-driven software programs which react to hyper text transfer protocol (HTTP) requests from the client. The applications are generally executed on application servers, constructed according to N-tier architecture, in which presentation, business logic, and data access layers are kept separate. Recently, web applications have evolved into large-scale applications that demand more sophisticated computing services.

FIG. 1 shows an exemplary data center 100 that is utilized for executing web applications. Data center 100 includes clients 110-1 through 110-N, web servers 120-1 through 120-M, application servers 130-1 through 130-Q, back-end systems 150, a load balancer 160, and a network 170. Clients 110 submit requests (e.g., HTTP requests) to web servers 120 through network 170. Load balancer 160 distributes the requests among the servers 120 to balance the load between servers 120 and 130. Each of web servers 120 dynamically generates presentation, for example, using servlets, or extensible markup language (XML), extensible style-sheet language (XSL), and the likes. Application servers 130 are often responsible for deploying and running the business logic layer and for interacting with and integrating various enterprise-wide resources, such as web servers 120, and back-end systems 150. The back-end system 150 may include, for example, a database and a legacy system.

Workload may be distributed across a cluster of application servers 130 in different ways. For example, application code may be replicated across multiple application servers in the cluster, enabling a given request to be processed by any of these multiple application servers 130. Also, application code may be logically partitioned over multiple application servers 130, e.g., so that a particular server 130 is responsible for performing particular types of operations. This type of application partitioning may improve the application performance. For example, data-intensive application logic may be configured to run on an application server that is closest to a data source, in order to reduce the latencies associated with accessing remotely located data.

As the web and application servers 120 and 130 become busier with handling more and more requests, the quality and level of service sharply decrease. With existing load balancing capabilities, once the servers are saturated, the quality of service drops drastically for all clients accessing a web site. Currently, a standard tool that automatically monitors, manages, and controls the operation and load of applications and servers is not found in the related art. The management and control of web applications mostly relies on technical personnel. This results with many drawbacks including unpredictable level of service and uncontrolled user experience as well as costly maintenance of applications. Additionally, the application management is static, i.e., the ability to detect problems and solve them in real-time is not feasible. Another major drawback is the inability to deliver services according to predefined service level agreements (SLAs), as the ability to provide committed services increasingly becomes a competitive requirement. Yet, another major drawback is the inability to balance the load differently per transaction in servers that are installed with multiple applications.

It would be therefore advantageous to provide a network solution for automatically managing and controlling web applications that overcome the drawbacks mentioned in the prior art.

SUMMARY OF THE INVENTION

The present invention includes a network sniffer passively capturing data traffic flows between a plurality of clients and a plurality of web servers. The network sniffer includes a traffic processor for processing data traffic sent from the plurality of clients and from the plurality of web servers; an application learner for identifying transactions sent from the plurality of clients; and a monitor for monitoring and generating statistics respective of the operation of the web servers and their respective web applications.

The present invention further includes a method for maintaining a level of service of web applications. The method includes passively sniffing network traffic flows from a plurality of clients and a plurality of web servers; generating a context for each request sent from a client to a web server and for each reply sent from a web server to a client; determining whether the context belongs to an identified transaction; gathering statistics respective of the identified transaction; and generating a plurality of reports and alarms based on the gathered statistics.

The present invention also includes a computer program product including a computer-readable medium comprising software instructions operable to enable a computer to perform a method for maintaining a level of service of web applications. The computer program product causing a computer to execute the processes of passively sniffing network traffic flows from a plurality of clients and a plurality of web servers; generating a context for each request sent from a client to a web server and for each reply sent from a web server to a client; determining whether the context belongs to an identified transaction; gathering statistics respective of the transaction; and generating a plurality of reports and alarms based on the gather statistics.

DETAILED DESCRIPTION OF THE INVENTION

Figure 1:
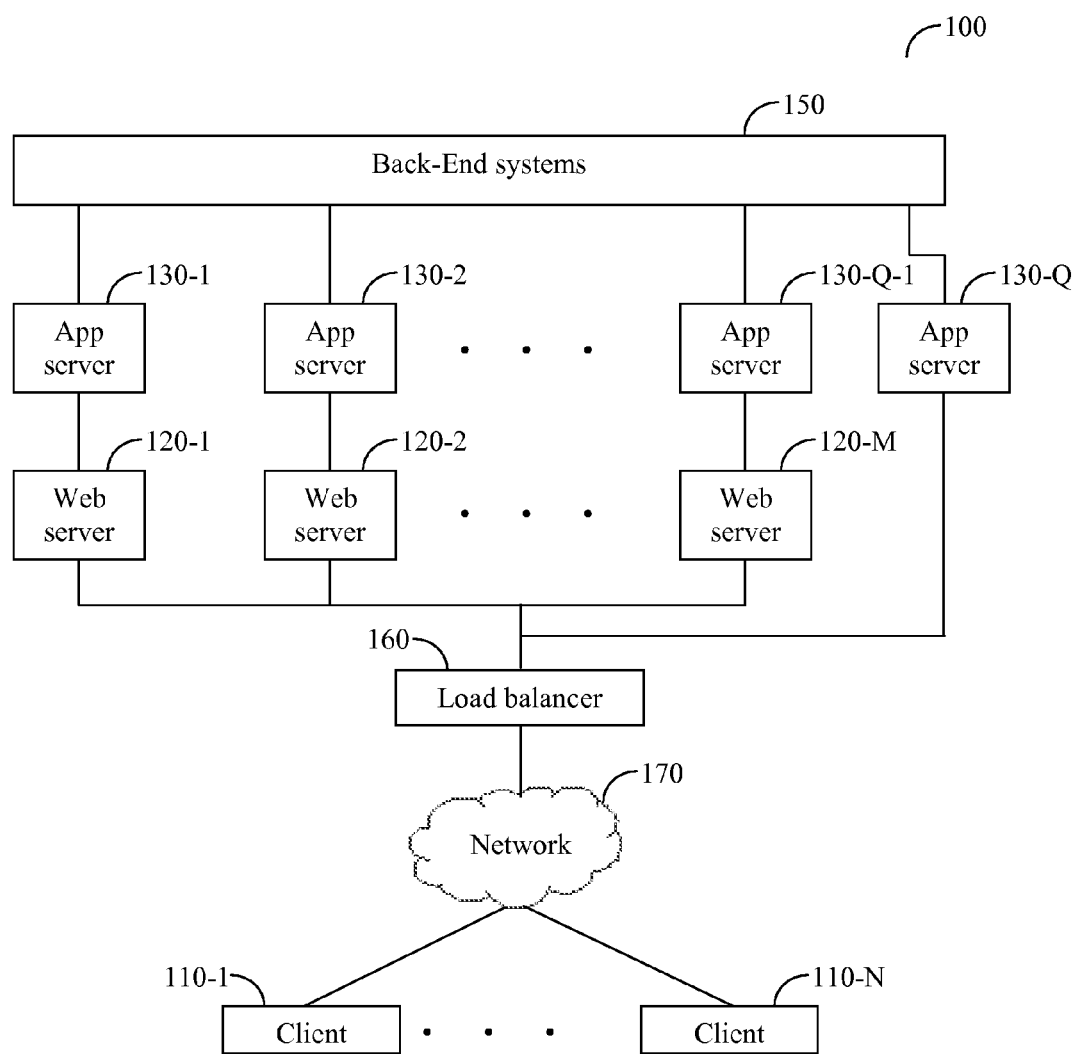
FIG. 1—is a non-limiting data center utilized for executing web applications (prior art)
Figure 2A:
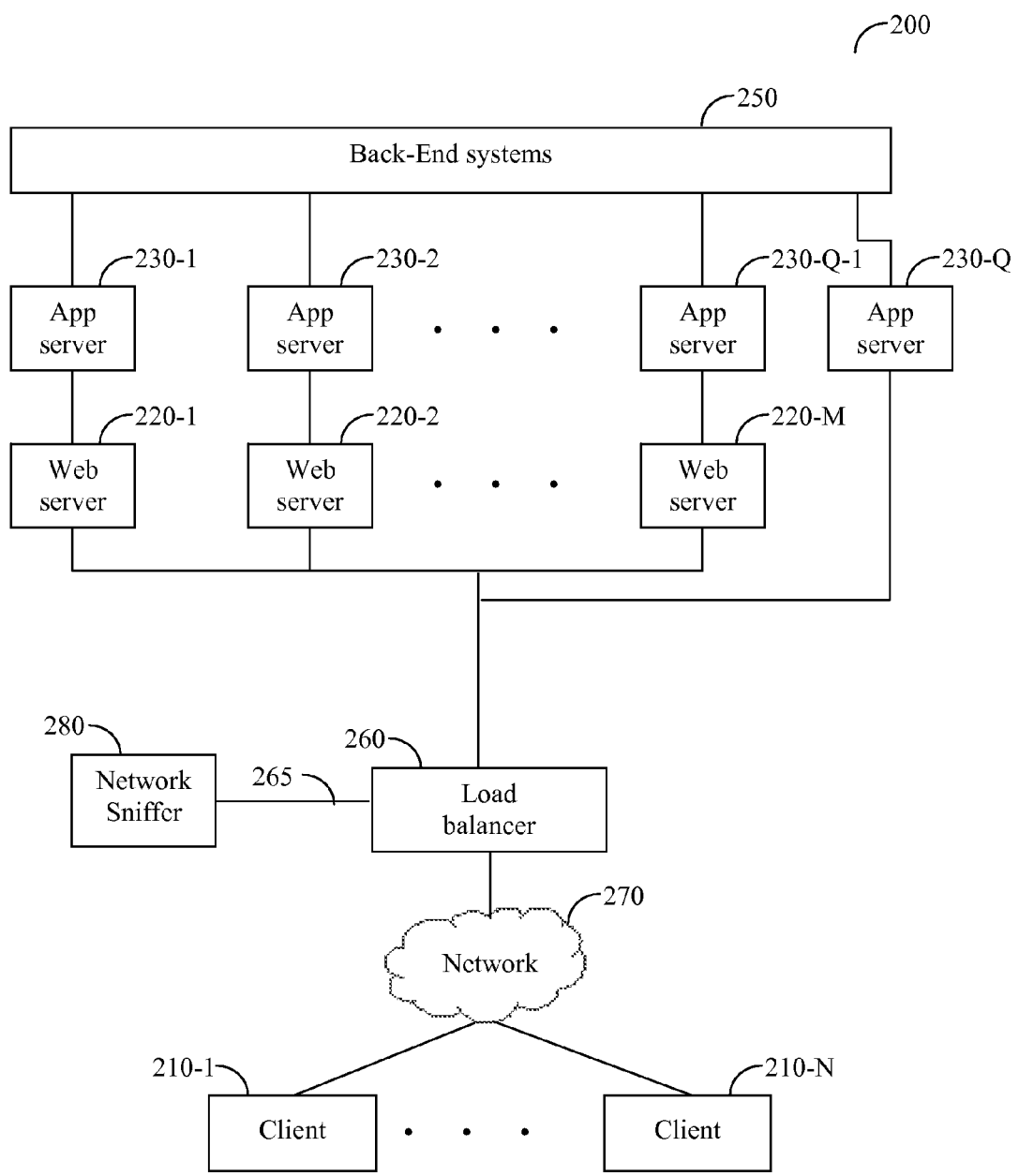
FIGS. 2A, 2B and 2C—are diagrams of a data center constructed in accordance with exemplary embodiments of the present invention.

FIG. 2A shows a non-limiting and exemplary diagram of a data center 200 constructed in accordance with one embodiment of the present invention. Data center 200 includes clients 210-1 through 210-N, web servers 220-1 through 220-M, application servers 230-1 through 230-Q connected to back-end systems 250, a load balancer 260, and a network 270. Data center 200 further includes a network sniffer 280 that allows the maintaining of a consistent level of service of web applications. Network sniffer 280 is a passive sniffing device that can be connected to data center 200 in various configurations, with several examples discussed in detail below. Web servers 220 process requests sent from clients 210 and respond with the processing result. Application servers 230 execute the business logic of the web applications and communicate with back-end systems 250, which implement the data layer of the applications. Load balancer 260 mainly distributes incoming requests to servers 220 and 230 that run the applications to which the requests are targeted. In some configurations, web server 220 and application server 230 can act in a single entity (e.g. sever 230-Q).

To ensure a committed level of service defined by, for example, a service level agreement (SLA) network sniffer 280 learns the structure of a web-application, monitors the operation of the application, and optionally controls the processing of incoming requests to achieve optimal performance and level of service.

As shown in FIG. 2A, network sniffer 280 is connected to load balancer 260 through a dedicated port 265, e.g., a switched port analyzer (SPAN), thus traffic on any port of load balance 260 is copied to port 265. That is, network sniffer 280 receives any traffic captured by the load balance.

Figure 2B:
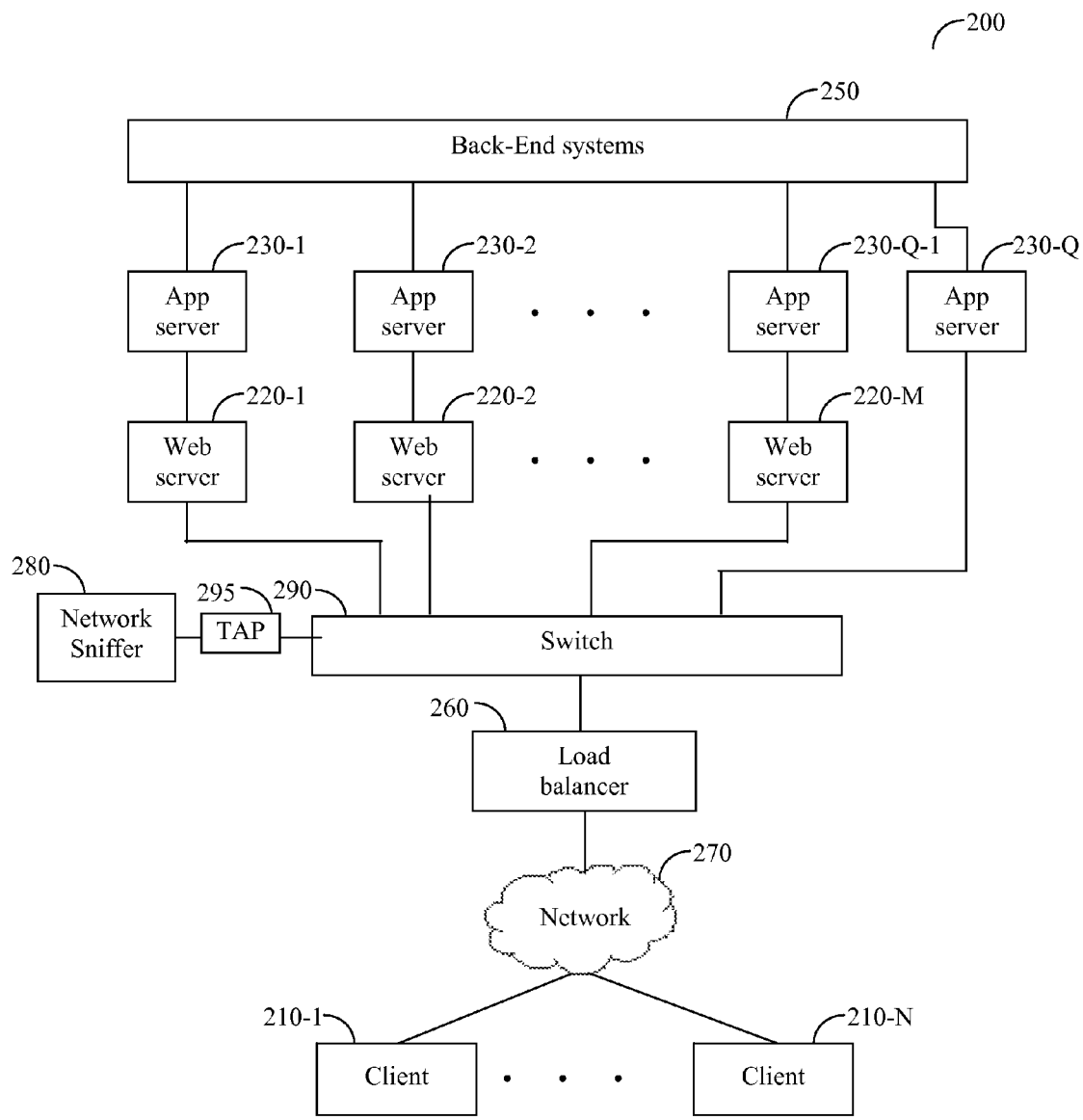

In another embodiment shown in FIG. 2B, network sniffer 280 can be coupled to a switch 290 which is connected to a load balancer 260 and web servers 220 and/or application servers 230. In this embodiment network sniffer 280 is connected to switch 290 through a dedicated port 290-1, which may be either a SPAN or a network tap 295. Network tap 295 is a device which provides an access to data flowing from and to load balancer 260. As shown in FIG. 2B, the switch 290 is connected between load balancer 260 and servers 220 and 230 and also coupled to network tap 295. That is, network tap 295 passes the traffic between load balancer 260 and switch 290 to its port (e.g., monitor port) which connected to sniffer 280, thus enabling it to listen.

Figure 2C:
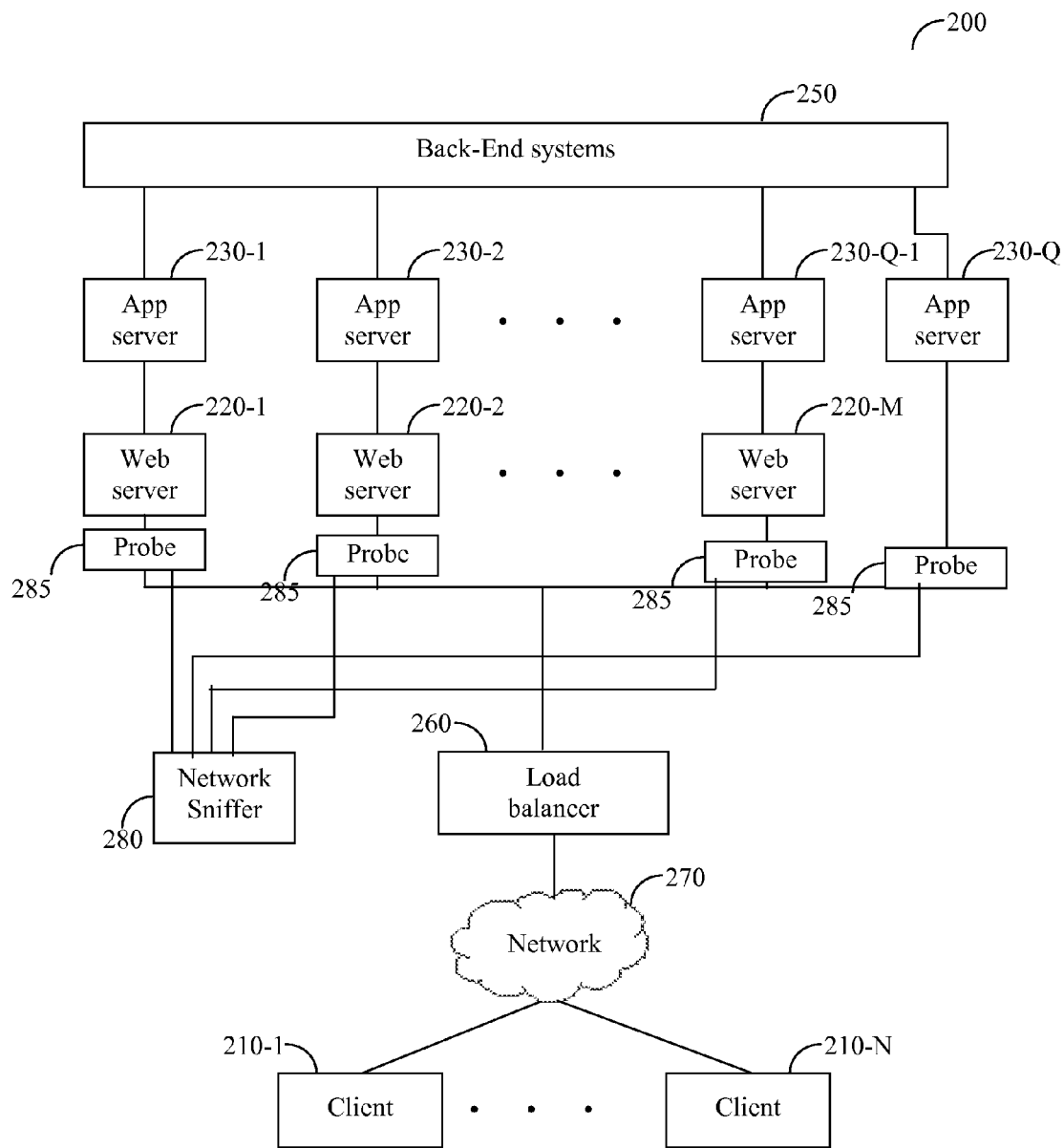

In another embodiment, shown in FIG. 2C, a plurality of traffic probes 285 are coupled to web servers 220 and/or application servers 230. Probes 285 monitor traffic flow from and to the servers 220 or 230 and forward monitoring events to network sniffer 280. Specifically a probe parses the traffic, classifies to transactions, and measures the various traffic parameters, such as latency, throughput, hits per second, number of errors, and so on. Each probe 285 sends these measured parameters to network sniffer 280 where all measurements from all probes 285 are aggregated.

Figure 3A:
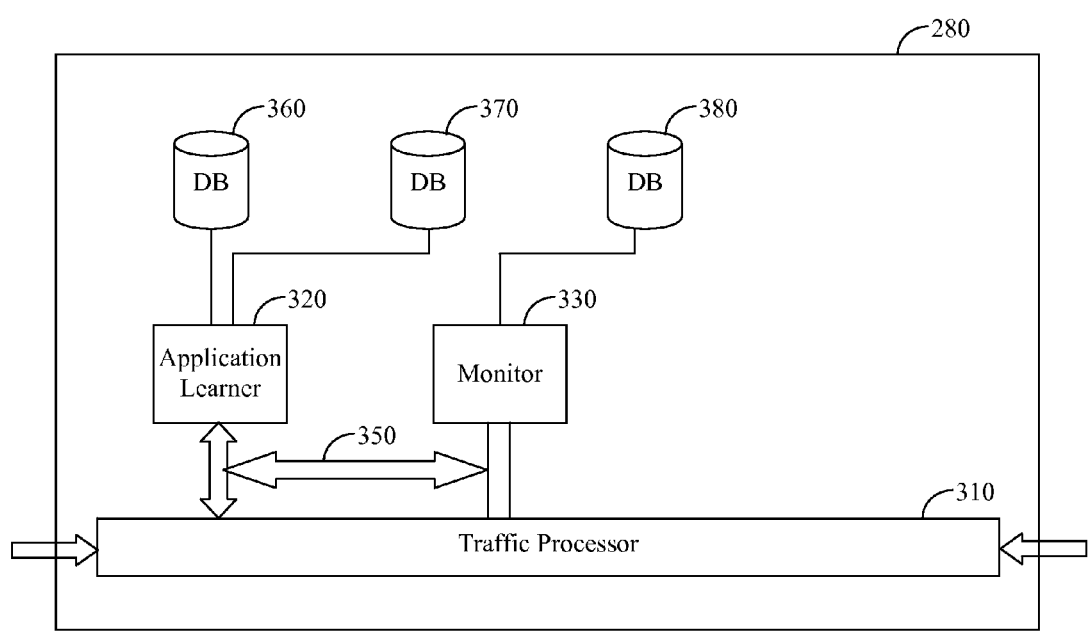
FIGS. 3A and 3B are block diagrams of a sniffer network disclosed in accordance with the present invention.

FIG. 3 shows a non-limiting block diagram of network sniffer 280 disclosed in accordance with an embodiment of the present invention. Network sniffer 280 comprises a traffic processor 310, an application learner 320, and a monitor 330 connected to a common bus 350. Network sniffer 280 further includes databases 360 and 370 coupled to application learner 320 and a database 380 coupled to monitor 330. In other embodiments, network sniffer 280 includes a single database commonly coupled to application learner 320 and monitor 330.

Figure 3B:
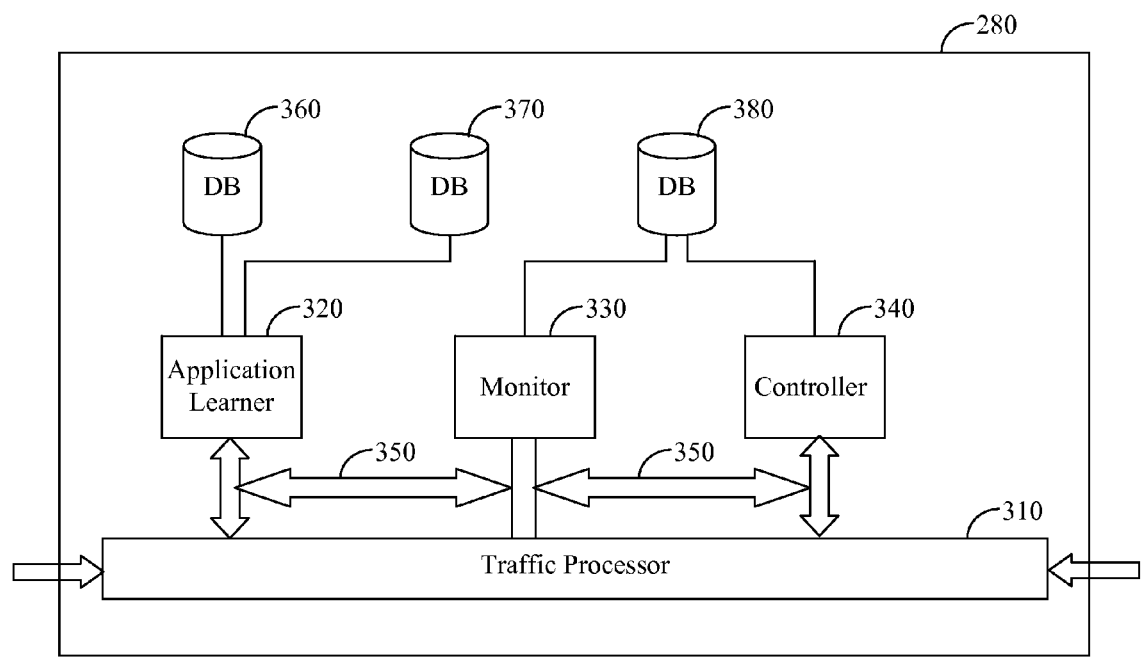

In another embodiment of the present invention network sniffer 280 may also include a controller adapted to control load balancer 260 to perform corrective actions in order to deliver services according to predefined SLAs. As shown in FIG. 3B network sniffer 280 includes a controller 340 coupled to common bus 350, traffic processor 310, and database 380.

Traffic processor 310 receives HTTP requests submitted by clients 210 as well as replies sent from servers 220 and 230 (see also FIG. 2). Specifically, once a session is established with a client 210 a client connection handler (not shown) is allocated. The client connection handler waits for data, i.e., a HTTP request submitted by a client 210, and once received, the data is sent to a parser (not shown). Both the parser and the client connection handler are part of the traffic processor 310. While processing the request, the parser returns a context of the request. A context is a joined HTTP request-reply entity. The context fields include, but are not limited to, a site name, a HTTP method, a URL, request parameters, HTTP cookies, a HTTP status code, a HTTP server, a HTTP content type, a HTTP content length, a HTML title field, and the like. The context is sent to application learner 320, monitor 330, and controller 340.

When load-balance or SLM schemes are utilized by controller 340, requests may be stalled or dropped. When a reply, i.e., HTTP response is sent from a web server 230, a web server (WS) connection handler (not shown), in the traffic processor, is allocated. The WS connection handler waits until the header of the response arrives, and then forwards the header to the parser, which sends the context to application learner 320, monitor 330, and controller 340.

Application learner 320 identifies web applications, their transactions and modules and registers the learnt information in a classify data structure (CDS). The CDS includes a list of identified sites, for each site a list of its applications, and for each application a list transactions and modules that construct the application. A module is a group of transactions. Application learner 320 further generates for display purposes a site tree, which includes all discovered applications that belong to a designated site. The CDS is used in real-time to classify incoming requests to applications. The site tree and the CDS are saved in database 370.

Figure 5:
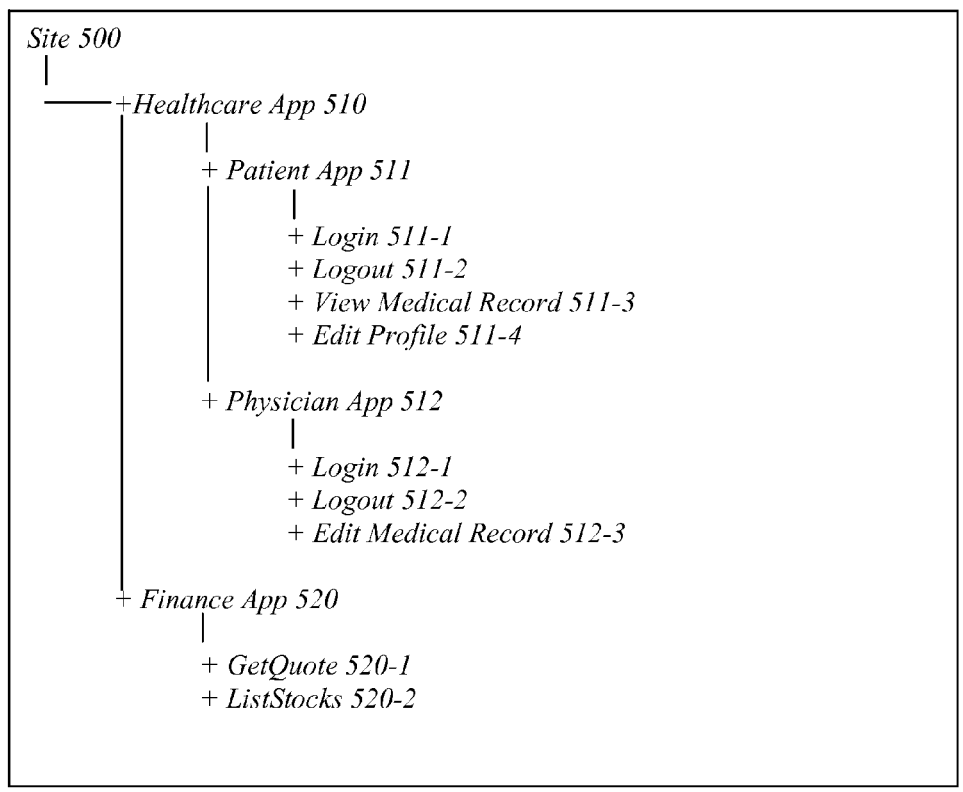
FIG. 5—is an exemplary diagram of a site tree.

FIG. 5 provides an example for a site tree. A web site 500 has two applications: a healthcare 510 and finance 520. Healthcare application 510 is composed of two applications, a patient 511 and a physician 512. Patient application 511 includes the transactions Login 511-1, Logout 511-2, View Medical Record 511-3, and Edit Profile 511-4. Physician application 512-1 includes the transactions: Login 512-1, Logout 512-2, and Edit Medical Record 512-3. Finance application 520 includes only the transactions GetQuote 520-1 and ListStocks 520-1.

Application learner 320 performs at least three tasks that include classifying, learning, and collecting. The classification includes determining, on-the-fly, for each context (i.e., parsed request) whether the incoming request belongs to a previously discovered application, and if so an application identification (ID) number is assigned to the context. Unidentified context messages may be further processed for the purpose of learning new applications and their transactions and modules. The collection task is invoked upon a reply message and it decides if the context should be collected. A context to be collected is saved, in a chronologic order, in database 360. The learning task is invoked every predefined period of time or whenever the number of collected contexts is above a predefined threshold. The learning task processes data stored in database 360 and attempts to discover a new application using a plurality of application definers and correlation processes. The application definers include conditions that are checked against context data in database 360. An example for application definers are a path of a cookie, the name of the parameter name, and so on. If one of the application definers is satisfied, then a new application is found and inserted to the CDS in an entry of the relevant site. That is, a new entry is created and the application ID together with the URL are added to the entry. In one embodiment of the present invention, the learning of applications can also be performed by correlating a plurality of saved contexts that share a common property, such as URL and parameter.

Monitor 330 executes all activities related to the generation of statistics respective of the operation of the web servers and their respective applications. The statistics include, but are not limited to, measuring throughput, response time, number of errors, hits per second, latency, and so on. The statistics are kept in database 380 on a per server basis, on a per application basis, and on a per application/server combination basis. In accordance with an embodiment of the disclosed invention, a plurality of reports are produced based on the gathered statistics. These reports can be presented by means of a graphical user interface (GUI) and/or sent to a system administrator by email. Furthermore, monitor 330 generates a plurality of alerts indicating on a failure or bad performance. The alerts may be displayed or sent to a user as an email message, a short text message, and the like. Additionally, alerts may be in the form of SNMP traps, system-log alerts, entries in an alerts database that is accessed for reports, alerts generated by means of scripts, and so on.

Controller 340 instructs load balancer 260 and servers 220 and 230 to execute corrective actions that optimized the performance of each web application executed by the web and application servers. These corrective actions include, but are not limited to, scheduling requests to reduce response time, shaping traffic to balance the load, recovery actions when one of the servers fails, redirecting of requests, sending spoof replies to clients, and so on. Controller's 340 actions are performed according to a set of policies predetermined for each server, application, transaction, and module in an application. Generally, a policy defines an allowed value range for each status parameter and the actions to be taken if a status parameter is not within its range. Each policy is assigned with a priority and the time periods that the policy should be activated and the users it is relevant for. For example, a policy may define a maximum allowable latency value for an application and a threshold from which corrective actions should be taken. The corrective action may be, but is not limited to, the transfer of requests to a less busy server. As another example, a policy may define the minimum allowable throughput for an application and the corrective action may be stalling traffic directed to the server that executes the application. It should be noted that if a policy includes two or more corrective actions, then each of the actions may be assigned with a different priority.

Figure 4:
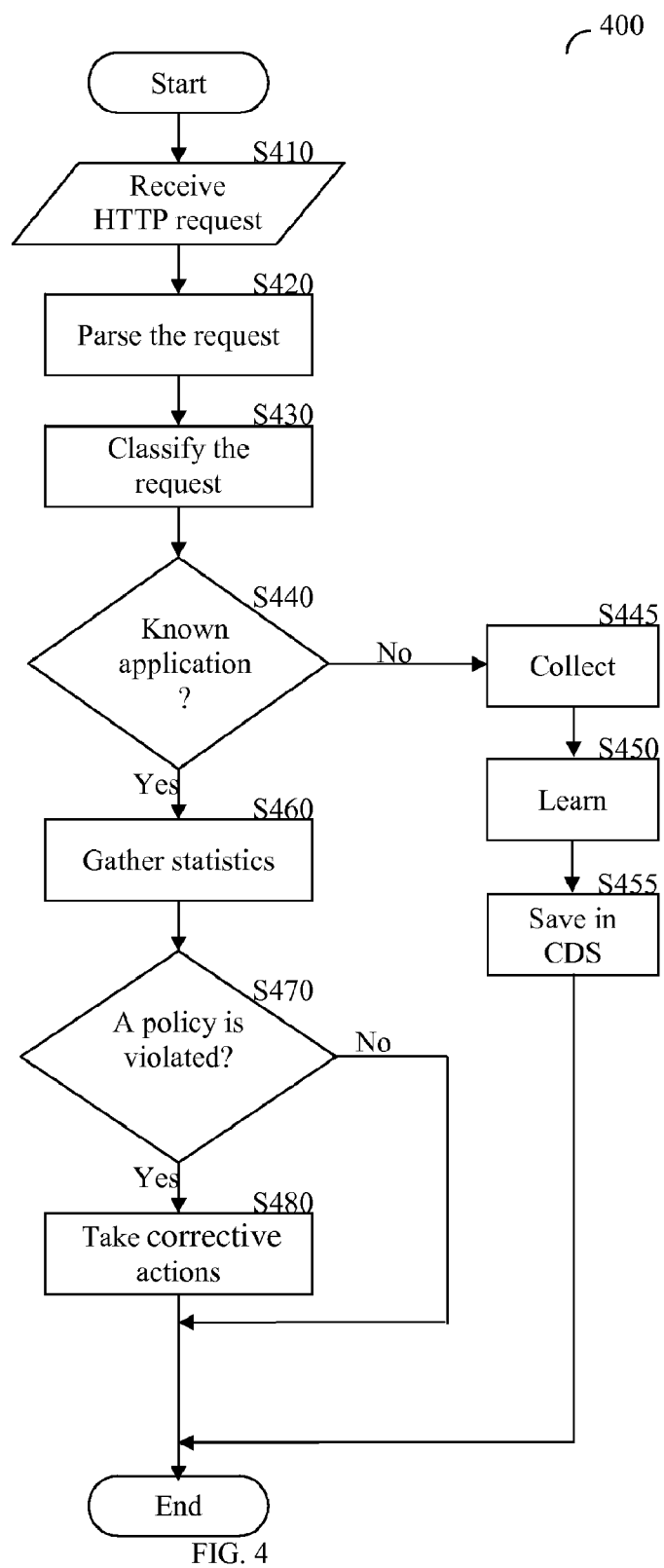
FIG. 4—is a flowchart describing the operation of a sniffer network in accordance with an embodiment of the present invention.

FIG. 4 shows a non-limiting and exemplary flowchart 400 describing the operation of network sniffer 280, in accordance with one embodiment of the present invention. At S410, an HTTP request sent from a client 210 is received at the network sniffer 280. At S420, the HTTP request is parsed to generate a context of the request. At S430, the request is classified to determine whether the request belongs to a known or unknown application. This is performed by matching the context against the CDS and a plurality of classification filters and if the filtering result with an application ID, the incoming request belongs to a known (learnt) application or transaction. At S440, a check takes place to determine if an application ID was detected, and if so execution continues with S460; otherwise, executions proceeds to S445 where the context is saved in database 360. Subsequently, the context is sent to a web server 220. At S450, application learner 320 discovers the applications and preferably applications' transactions and modules related to the context. The learnt information is kept, at S455, in a CDS format in database 370.

At S460, statistics respective of the application are gathered. That is, at least the status parameters: throughput, response time, latency, hits per second, and number of returned errors are measured and saved in database 380. The following steps are optional and performed only if the network sniffer 280 includes a controller 340. At S470, it is checked if at least one of the policies defined for the application is violated. Namely, it is determined if the measured status parameters are within the allowed range, and if so execution ends; otherwise, execution continues with S480 where one or more corrective actions, as defined in the violated policy, are taken. Examples for such actions are discussed in greater detail above.

In an exemplary embodiment, network sniffer 280 and the method described herein further implement a feedback mechanism. Specifically, after a corrective action is taken, network sniffer 280 monitors the result of the action, i.e., whether the monitored parameters values improved due to the corrective action or actions. Accordingly, Network sniffer 280 updates controller 340 with the next corrective actions to activate. For example, if an action has not made a difference, this action would be less likely to be activated when subsequent request is received.

In accordance with an embodiment of the present invention, network sniffer 280 tracks transactions and actual users that access the web applications in servers 220 and 230. Tracking users is performed by: a) adding a token (e.g., a cookie) to the HTTP traffic; b) identifying existing cookies that are used by existing user-management mechanisms; c) tracking secure sockets layer (SSL) sessions; or d) any combination thereof. The ability to track user activity allows for identifying transactions. Specifically, network sniffer 280 detects navigation routes of users, i.e., how users move between applications' transactions; compares between the detected routes; and deduces from the collected information which parts of the routes comprise independent transactions. It should be noted that not all navigation routes are considered as transactions or identified as such.

It should be noted that various modifications, combinations, sub-combinations and alterations of the above-described embodiments may occur, as required, insofar as they are within the scope of the appended claims or the equivalents thereof.

The principles of the present invention may be implemented as a combination of hardware and software. The software may be implemented as an application program tangibly embodied on a program storage unit or computer readable medium. The application program may be uploaded to, and executed by, a machine comprising any suitable architecture, for example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means that can provide those functionalities as equivalent to those shown herein.

What is claimed is:

1. A network sniffer for passively capturing data traffic flows between a plurality of clients and a plurality of web servers, the network sniffer comprising:
    a traffic processor for processing data traffic sent from the plurality of clients and from the plurality of web servers, wherein the traffic processor is configured to collect contexts by parsing each request for content from each of the plurality of clients to retrieve a context, wherein the context includes at least one of a web server name and request parameters;
    an application learner for identifying transactions sent from the plurality of clients, wherein the application learner is configured to determine if the each request for content belongs to a previously discovered application, and when the each request for content has been determined as belonging to the previously discovered application, the application learner is configured to assign an application identification of the previously discovered application to the context that is retrieved by parsing the each request for content;
    a monitor for monitoring and generating statistics respective of the operation of the web servers and their respective web applications; and
    a controller for performing a corrective action when a predefined policy has been violated, wherein the predefined policy defines a minimum allowable throughput for an application, wherein the corrective action comprises stalling traffic directed to a server that executes the application, wherein a result of the corrective action is monitored to determine whether at least one monitored parameter is improved due to the corrective action and the controller is updated with a next corrective action to activate when a subsequent request is received based on the monitored result,
    wherein at least one of the traffic processor, the application learner and the monitor is implemented in hardware or stored in a memory.

2. The network sniffer of claim 1, further comprising a common bus for providing a communication medium between the traffic processor, the application learner, the monitor, and the controller.

3. The network sniffer of claim 2, wherein the network sniffer is connected to a load balancer through a dedicated port.

4. The network sniffer of claim 3, wherein the dedicated port is a switch port analyzer (SPAN).

5. The network sniffer of claim 2, wherein the network sniffer is connected through a dedicated port to a switch, wherein the switch is coupled to the plurality of web servers.

6. The network sniffer of claim 2, wherein the network sniffer is connected to a network tap device to monitor traffic flow between a switch and a load balancer.

7. The network sniffer of claim 3, wherein the network sniffer is coupled to a plurality of traffic probes, wherein each of the traffic probes is connected to a web server.

8. The network sniffer of claim 1, wherein a web server includes a web application, and wherein the network sniffer is configured to send the context to one of the plurality of web servers.

9. The network sniffer of claim 1, wherein the traffic sent from the clients includes at least hypertext protocol (HTTP) requests, and wherein the context includes the web server name, an HTTP method, a URL, the request parameters, HTTP cookies, an HTTP status code, an HTTP server, an HTTP content type, an HTTP content length and an HTML title field.

10. The network sniffer of claim 1, wherein the traffic sent from the plurality of web servers includes at least HTTP replies.

11. The network sniffer of claim 10, the application learner further performing at least one of the following tasks:
    discovering transactions executed by the plurality of web servers;
    classifying incoming requests to discovered web transactions;
    collecting non-classified incoming requests; and
    generating a site tree.

12. The network sniffer of claim 11, wherein the site tree includes all identified applications that belong to a designated web site, wherein each identified application includes a list of transaction that construct the application.

13. The network sniffer of claim 11, wherein the collected incoming requests are saved in a first database coupled to the application learner.

14. The network sniffer of claim 13, wherein discovering the transactions further comprises:
    processing requests saved in the first database using at least a plurality of application definers; and
    saving information related to the discovered web applications in a classify data structure (CDS).

15. The network sniffer of claim 14, wherein the CDS includes a list of identified sites, for each site a list of its web applications, and for each web application a list of transactions and modules that construct the web application.

16. The network sniffer of claim 15, wherein the CDS is saved in a second database, wherein the second database is coupled to the application learner.

17. The network sniffer of claim 1, wherein the statistics respective of the operation of the web servers are generated for each transaction and include the following measures: throughput, response time, number of errors, latency, and hits per second.

18. The network sniffer of claim 17, wherein the generated statistics are saved in a third database that is coupled to the monitor.

19. The network sniffer of claim 1, wherein the monitor produces a plurality of reports and a plurality of alerts based on the generated statistics.

20. The network sniffer of claim 1, wherein the controller performs corrective actions according to a plurality of predefined policies, wherein the corrective actions include scheduling requests to reduce response time, shaping traffic to balance the load, and recovery actions on web servers when one of the web servers fails.

21. The network sniffer of claim 20, wherein each of the plurality of predefined policies defines at least one corrective action to be preformed.

22. The network sniffer of claim 21, wherein a policy is determined for a web server, a web application, a module, and a transaction.

23. The network sniffer of claim 21, wherein each policy is assigned with a priority and time periods to be activated.

24. The network sniffer of claim 1, wherein when the corrective action has not made a difference to the at least one monitored parameter, the controller is less likely to activate the corrective action when the subsequent request is received.

25. A method for passively capturing data traffic flows between a plurality of clients and a plurality of web servers, the method comprising:
processing data traffic sent from the plurality of clients and from the plurality of web servers, comprising collecting contexts by parsing each request for content from each of the plurality of clients to retrieve a context, wherein the context includes at least one of a web server name and request parameters;
identifying transactions sent from the plurality of clients, comprising determining if the each request for content belongs to a previously discovered application, and when the each request for content has been determined as belonging to the previously discovered application, assigning an application identification of the previously discovered application to the context that is retrieved by parsing the each request for content;
monitoring and generating statistics respective of the operation of the web servers and their respective web applications;
performing a corrective action when a predefined policy has been violated, wherein the predefined policy defines a minimum allowable throughput for an application, wherein performing the corrective action comprises stalling traffic directed to a server that executes the application; and
monitoring a result of the corrective action to determine whether at least one monitored parameter is improved due to the corrective action and activating a next corrective action when a subsequent request is received based on the monitored result.

26. The method of claim 25, wherein the method comprises performing load balancing or performing traffic probing.

27. The method of claim 25, wherein a web server includes a web application, and wherein the method comprises sending the context to one of the plurality of web servers.

28. The method of claim 25, wherein the traffic sent from the clients includes at least hypertext protocol (HTTP) requests, and wherein the context includes the web server name, an HTTP method, a URL, the request parameters, HTTP cookies, an HTTP status code, an HTTP server, an HTTP content type, an HTTP content length and an HTML title field.

29. The method of claim 25, wherein the traffic sent from the plurality of web servers includes at least HTTP replies.

30. The method of claim 25, wherein identifying the transactions sent from the plurality of clients comprises at least one of:
discovering transactions executed by the plurality of web servers;
classifying incoming requests to discovered web transactions;
collecting non-classified incoming requests; and
generating a site tree.

31. The method of claim 30, wherein the site tree includes all identified applications that belong to a designated web site, and wherein each identified application includes a list of transaction that construct the application.

32. The method of claim 30, wherein identifying the transactions sent from the plurality of clients comprises saving the collected incoming requests in a first database.

33. The method of claim 32, wherein discovering the transactions comprises:
processing requests saved in the first database using at least a plurality of application definers; and
saving information related to the discovered web applications in a classify data structure (CDS).

34. The method of claim 33, wherein the CDS includes a list of identified sites, for each site a list of its web applications, and for each web application a list of transactions and modules that construct the web application.

35. The method of claim 34, wherein identifying the transactions sent from the plurality of clients comprises saving the CDS in a second database.

36. The method of claim 25, wherein monitoring and generating the statistics respective of the operation of the web servers and their respective web applications comprises generating the statistics respective of the operation of the web servers for each transaction, and wherein the statistics comprise: throughput, response time, number of errors, latency, and hits per second.

37. The method of claim 36, wherein the method comprises saving the generated statistics in a third database.

38. The method of claim 25, wherein the method comprises producing a plurality of reports and a plurality of alerts based on the generated statistics.

39. The method of claim 25, wherein performing the corrective action comprises performing corrective actions according to a plurality of predefined policies, wherein the corrective actions include scheduling requests to reduce response time, shaping traffic to balance the load, and recovery actions on web servers when one of the web servers fails.

40. The method of claim 39, wherein each of the plurality of predefined policies defines at least one corrective action to be preformed.

41. The method of claim 40, wherein the method comprises determining a policy for a web server, a web application, a module, and a transaction.

42. The method of claim 40, wherein the method comprises assigning each policy with a priority and time periods to be activated.

43. The method of claim 25, wherein when the corrective action has not made a difference to the at least one monitored parameter, the corrective action is less likely to be activated when the subsequent request is received.

44. A computer program product including a non-transitory computer-readable medium comprising software instructions operable to enable a computer to perform a method for passively capturing data traffic flows between a plurality of clients and a plurality of web servers, the method comprising:
- processing data traffic sent from the plurality of clients and from the plurality of web servers, comprising collecting contexts by parsing each request for content from each of the plurality of clients to retrieve a context, wherein the context includes at least one of a web server name and request parameters;
- identifying transactions sent from the plurality of clients, comprising determining if the each request for content belongs to a previously discovered application, and when the each request for content has been determined as belonging to the previously discovered application, assigning an application identification of the previously discovered application to the context that is retrieved by parsing the each request for content;
- monitoring and generating statistics respective of the operation of the web servers and their respective web applications;
- performing a corrective action when a predefined policy has been violated, wherein the predefined policy defines a minimum allowable throughput for an application, wherein performing the corrective action comprises stalling traffic directed to a server that executes the application; and
- monitoring a result of the corrective action to determine whether at least one monitored parameter is improved due to the corrective action and activating a next corrective action when a subsequent request is received based on the monitored result.

45. The computer program product of claim 44, wherein the method comprises performing load balancing or performing traffic probing.

46. The computer program product of claim 44, wherein a web server includes a web application, and wherein the method comprises sending the context to one of the plurality of web servers.

47. The computer program product of claim 44, wherein the traffic sent from the clients includes at least hypertext protocol (HTTP) requests, and wherein the context includes the web server name, an HTTP method, a URL, the request parameters, HTTP cookies, an HTTP status code, an HTTP server, an HTTP content type, an HTTP content length and an HTML title field.

48. The computer program product of claim 44, wherein the traffic sent from the plurality of web servers includes at least HTTP replies.

49. The computer program product of claim 44, wherein identifying the transactions sent from the plurality of clients comprises at least one of:
- discovering transactions executed by the plurality of web servers;
- classifying incoming requests to discovered web transactions;
- collecting non-classified incoming requests; and
- generating a site tree.

50. The computer program product of claim 49 wherein the site tree includes all identified applications that belong to a designated web site, and wherein each identified application includes a list of transaction that construct the application.

51. The computer program product of claim 49, wherein identifying the transactions sent from the plurality of clients comprises saving the collected incoming requests in a first database.

52. The computer program product of claim 51, wherein discovering the transactions comprises:
- processing requests saved in the first database using at least a plurality of application definers; and
- saving information related to the discovered web applications in a classify data structure (CDS).

53. The computer program product of claim 52, wherein the CDS includes a list of identified sites, for each site a list of its web applications, and for each web application a list of transactions and modules that construct the web application.

54. The computer program product of claim 53, wherein identifying the transactions sent from the plurality of clients comprises saving the CDS in a second database.

55. The computer program product of claim 44, wherein monitoring and generating the statistics respective of the operation of the web servers and their respective web applications comprises generating the statistics respective of the operation of the web servers for each transaction, and wherein the statistics comprise: throughput, response time, number of errors, latency, and hits per second.

56. The computer program product of claim 55, wherein the method comprises saving the generated statistics in a third database.

57. The computer program product of claim 44, wherein the method comprises producing a plurality of reports and a plurality of alerts based on the generated statistics.

58. The computer program product of claim 44, wherein performing the corrective action comprises performing corrective actions according to a plurality of predefined policies, wherein the corrective actions include scheduling requests to reduce response time, shaping traffic to balance the load, and recovery actions on web servers when one of the web servers fails.

59. The computer program product of claim 58, wherein each of the plurality of predefined policies defines at least one corrective action to be preformed.

60. The computer program product of claim 59, wherein the method comprises determining a policy for a web server, a web application, a module, and a transaction.

61. The computer program product of claim 59, wherein the method comprises assigning each policy with a priority and time periods to be activated.

62. The computer program product of claim 44, wherein when the corrective action has not made a difference to the at least one monitored parameter, the corrective action is less likely to be activated when the subsequent request is received.

* * * * *